United States Patent [19]

Kish et al.

[11] Patent Number: 5,010,872
[45] Date of Patent: Apr. 30, 1991

[54] STEAM-PRODUCING ORCHARD HEATER

[76] Inventors: Edward J. Kish, 9305 Tieton Dr., Yakima, Wash. 98908; Joseph E. Smith, 31379 Pittsburg Rd., St. Helens, Oreg. 97051

[21] Appl. No.: 570,869

[22] Filed: Aug. 22, 1990

[51] Int. Cl.$^5$ ............................................. A01G 13/06
[52] U.S. Cl. ....................................... 126/59.5; 431/1
[58] Field of Search ................... 126/59.5; 431/1, 122, 431/342; 47/2

[56] References Cited

U.S. PATENT DOCUMENTS

| | | | |
|---|---|---|---|
| 2,223,597 | 12/1940 | Brewster | 126/59.5 |
| 2,641,085 | 6/1953 | Robinson et al. | 47/2 |
| 2,857,332 | 10/1958 | Tenney et al. | 126/59.5 |
| 2,858,646 | 11/1958 | Higgins | 47/2 |
| 2,995,306 | 8/1961 | Barker | 237/55 |
| 3,017,367 | 1/1962 | Persechino | 126/59.5 |
| 3,055,144 | 9/1962 | Johnson et al. | 47/2 |
| 3,540,822 | 11/1970 | Filliol | 431/207 |
| 3,552,376 | 1/1971 | Olsen | 126/59.5 |
| 3,645,250 | 2/1972 | Porter et al. | 126/59.5 |
| 3,868,944 | 3/1975 | Hobby | 126/59.5 |
| 3,964,465 | 6/1976 | Diggs | 126/350 B |
| 3,982,524 | 9/1976 | Diggs | 126/59.5 |

Primary Examiner—James C. Yueng
Attorney, Agent, or Firm—George A. Cashman

[57] ABSTRACT

A steam-producing orchard heater operating on the pulse-jet combustion principle has a horizontal cylindrical combustion chamber with an exhaust tube of smaller diameter extending coaxially from one end thereof, an air supply and ignition tube, extending tangentially from the combustion chamber near the closed end, a fuel supply fitting in the combustion chamber in the same transverse plane as the air supply and ignition tube, and a water injection fitting near the exhaust tube end of the combustion chamber. Two legs are provided under the combustion chamber, and one leg is provided under the exhaust tube.

8 Claims, 3 Drawing Sheets

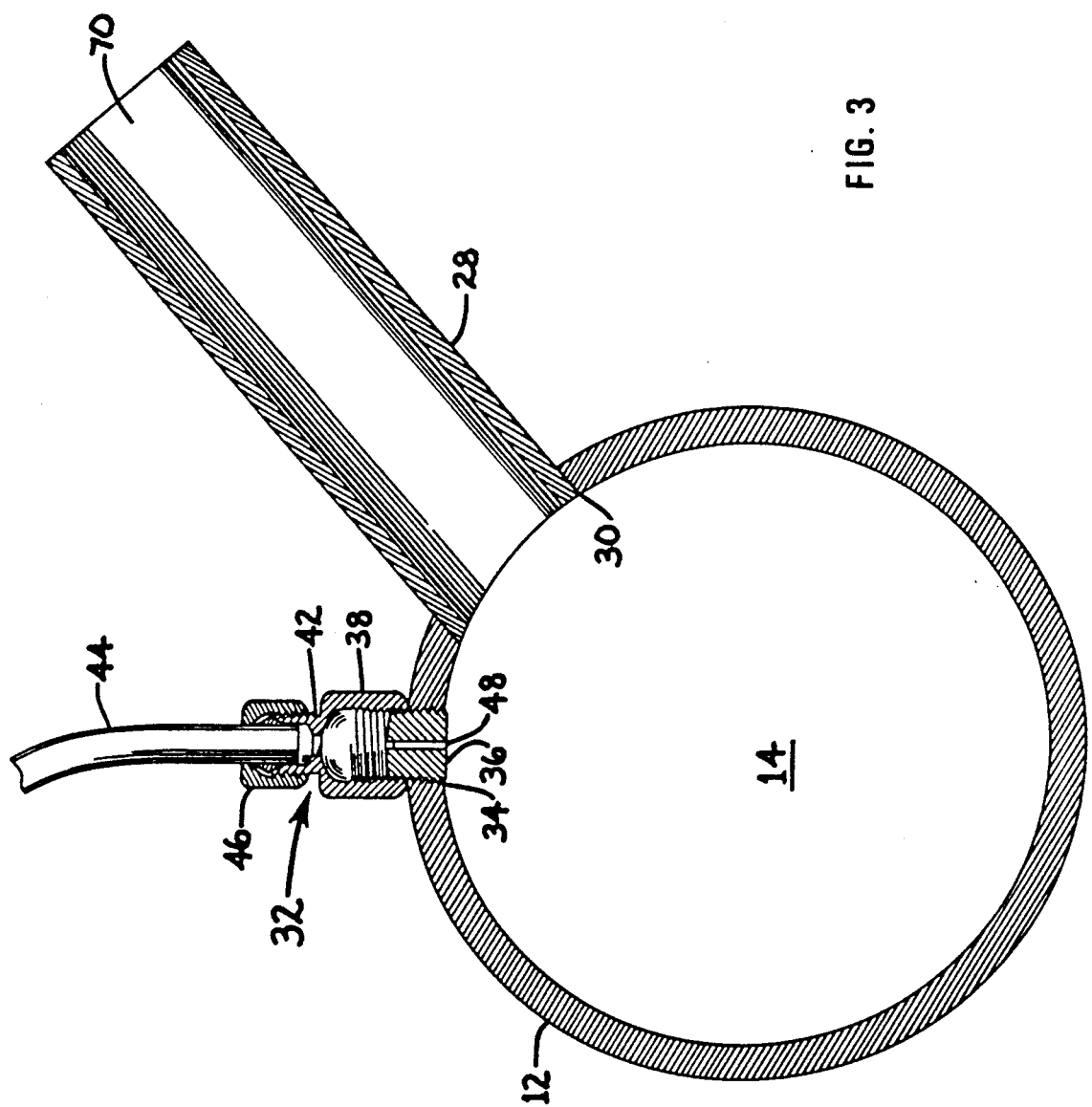

STEAM-PRODUCING ORCHARD HEATER

BACKGROUND OF THE INVENTION

1. Field of the Invention

Many fruit-producing areas are subject to frost or freeze damage to the fruit during the period when the fruit is budding or blossoming. The necessity for a means to prevent such damage to fruit orchards in such areas is, therefore, well-known. There are several ways of protecting the fruit.

Generally, the temperature will be lowest in still air, and there often will be an inversion where cold air is trapped near the ground. Many orchards use wind machines to move the air in this kind of situation. Wind machines tend to be expensive, and there are many orchards where wind machines are not needed because the orchard already has good air drainage. Regardless of air movement, any orchard may still be subject to frost or freeze damage if the temperature gets low enough.

Another method of protection is to surround the fruit with a finely atomized spray of water, and allow the water to freeze on the bud or blossom. The temperature will tend to stay at 32° F. (0° C.) because of the latent heat of fusion of water. Additionally, the more moist the surrounding air is, the less damage will be done because, the higher the moisture content of the air, the less evaporative cooling there will be of the buds and blossoms.

A third way to prevent frost and freezing damage is to provide heat for the orchard. The most common fuels used in orchard heaters are stove oil, furnace oil and liquefied petroleum gas (usually propane). The two basic requirements for orchard heaters are that they should have good fuel efficiency, and they should be of rugged, simple construction. Some orchards require hundreds of heaters to protect against frost and freeze. Considering that many orchard heaters burn 1 gallon of fuel per hour or more, and that the freezing temperatures may persist for several hours, the fuel bill becomes a substantial expense item, particularly if the cold temperatures continue for several nights. While the heaters are kept in place for the frost season, they are moved out of the way after that time, and are kept outdoors, and sometimes are roughly handled. Consequently, orchard heaters must be of strong construction.

It is an object of this invention to provide an orchard heater that will burn fuel at a comparatively low rate, and will burn the fuel completely.

It is a further object of this invention to provide an orchard heater having vaporized water in the hot air exhaust, in addition to that which is created in the fuel combustion process.

It is further object of this invention to provide an orchard heater of strong and simple construction, having no moving parts.

2. Description of the Related Art

Johnson et al. disclose a vaporizing device wherein a liquid is vaporized within a tube, and the vapor is aspirated from the tube by the flow of the products of combustion surrounding the tube, further assisted by air aspirated through a surrounding outer tube.

Both Diggs patents disclose water vaporized from an external pan on top of the heater. Porter et al. disclose an orchard heater having a pulse-jet type combustion chamber with an installed igniter, and an outer casing surrounding the combustion chamber and air inlet pipe.

The patents to Hobby, Olsen, Filliol and Robinson et al. disclose more-or-less standard vertically-oriented orchard heaters.

Higgins discloses a mobile heater with a motor-driven fan.

Barker discloses a salamander-type space heater.

SUMMARY OF THE INVENTION

A horizontal cylindrical combustion chamber is closed at its first end and has a concentric circular opening at the second end. An exhaust tube smaller in diameter than the combustion chamber extends coaxially from the opening in the second of the combustion chamber. An air supply and ignition tube extends tangentially from the combustion chamber near the closed end thereof. An orifice-type fuel inlet is fitted into the top of the combustion chamber in the same transverse plane as the air supply and ignition tube. An orifice-type water inlet is fitted into the bottom of the combustion chamber near the second end of the combustion chamber. The heater is fitted with two legs under the combustion chamber, and one leg under the exhaust tube. The heater is made entirely of steel, with the exception of the fuel and water inlet fittings, which are conventional brass fittings.

BRIEF DESCRIPTION OF THE DRAWINGS

FIG. 3 is a cross-section view taken on line 3—'of FIG. 2.

DESCRIPTION OF THE PREFERRED EMBODIMENT

Figure 1:
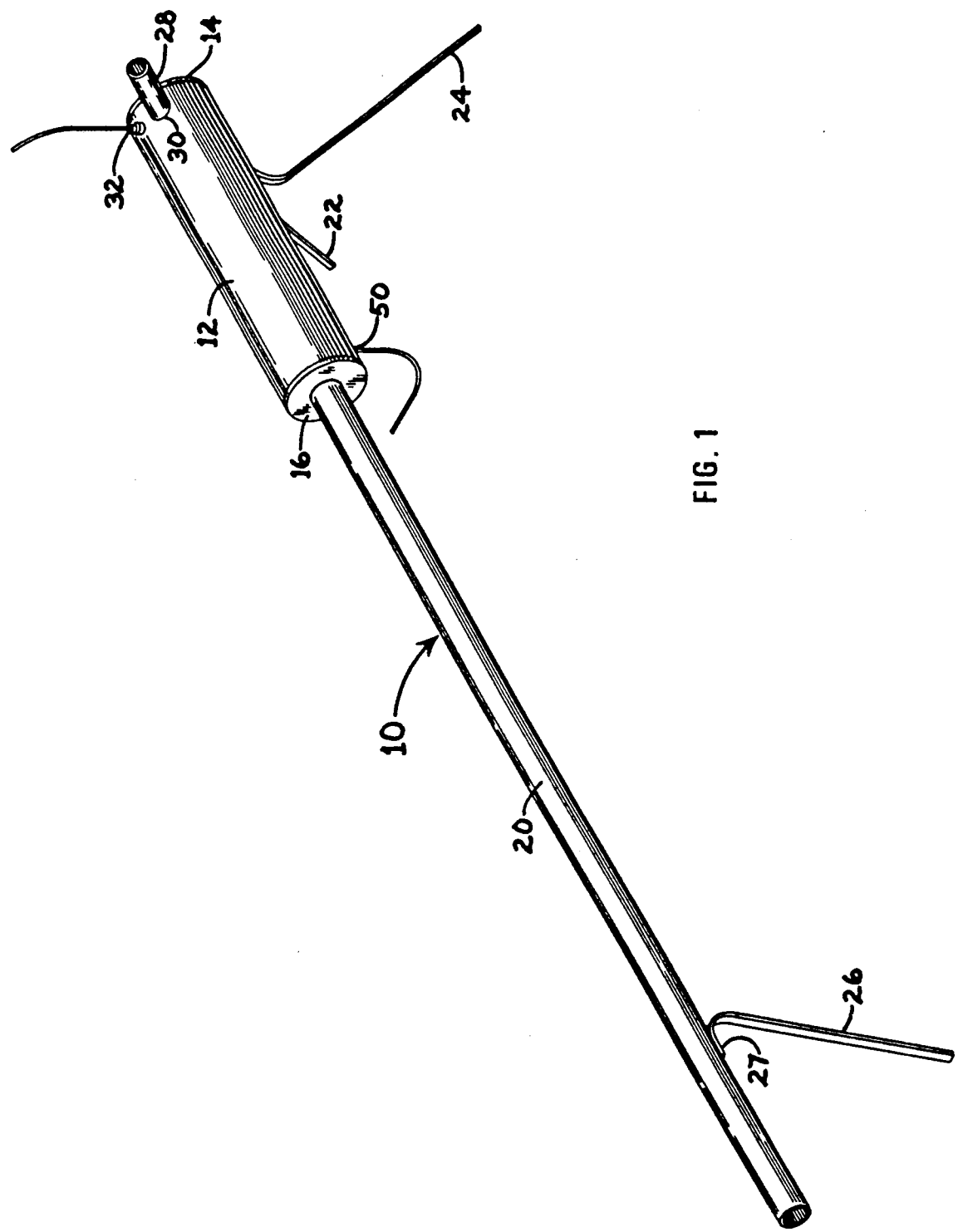
FIG. 1 is a perspective view of the orchard heater of this invention; including a partial fuel line and a partial water line.
Figure 2:
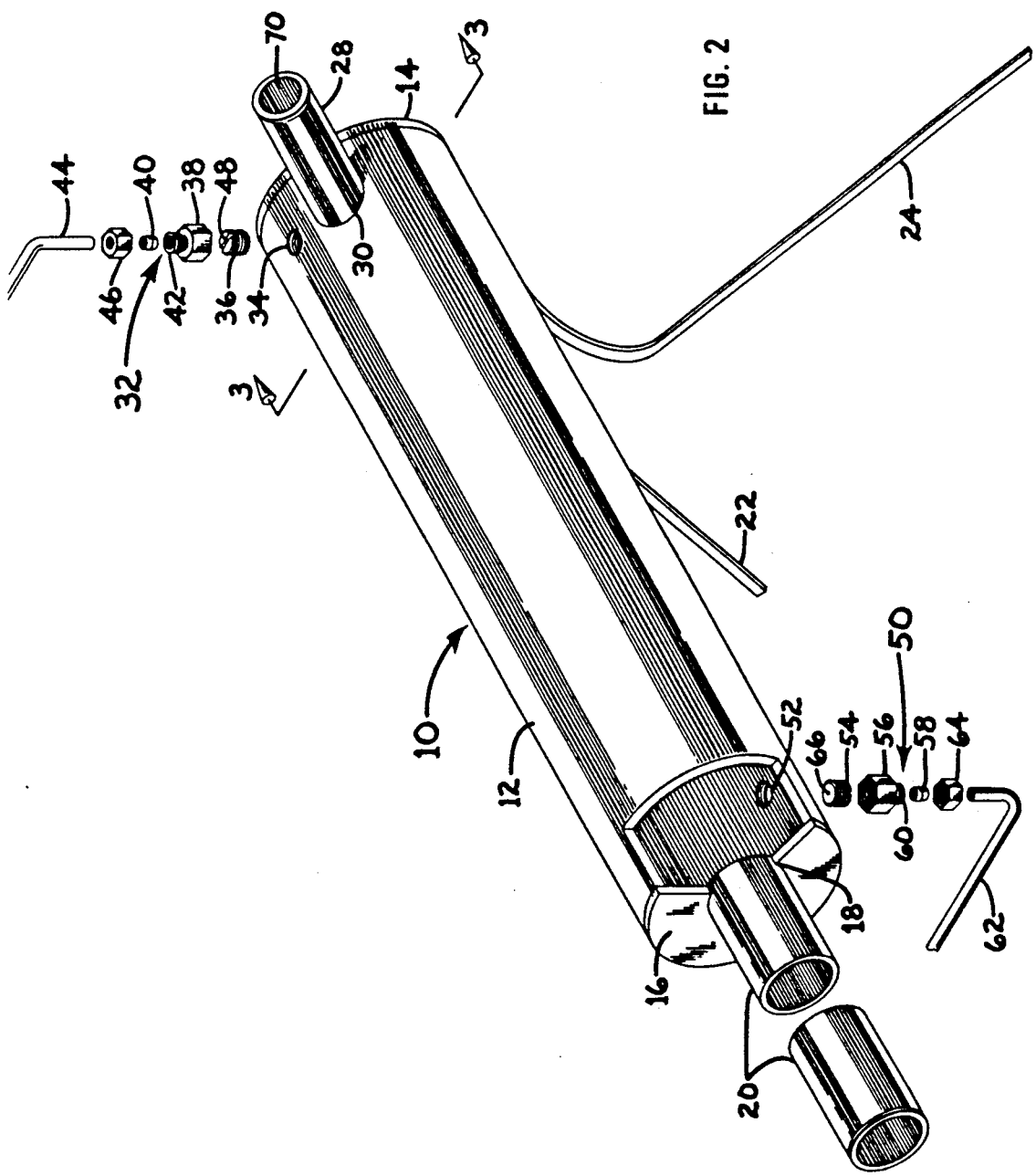
FIG. 2 is a perspective view, partially in section, of the heater to larger scale than FIG. 1 and showing the elements of the fuel and water inlet fittings in exploded fashion.

The steam-producing orchard heater 10 has a cylindrical combustion chamber 12 which has a disc-shaped first end closure 14. Although the size of the combustion chamber 10 may vary, the preferred embodiment is manufactured of 4" Schedule 40 steel pipe. The periphery of end closure 14 is flush with the outside diameter of combustion chamber 12. Second end closure 16 is of the same size as first end closure 14, and has a concentric circular opening 18. First end closure 14 and second end closure 16 are both welded to combustion chamber 12. Exhaust tube 12 is welded to opening 18 and extends coaxially from combustion chamber 12.

Legs 22 and 24 are steel bars which are welded at one end to the lower side of combustion chamber 12 on either side of the centerline thereof. Leg 26 is similarly welded at one end, as indicated at 27, to the bottom of exhaust tube 20. As manufactured and shipped, legs 22, 24 and 26 lie flat against the portion of the heater to which thay are welded. When the orchard heater is to be used, the free ends of legs 22, 24 and 26 are simply bent into place as shown in the drawings.

Air supply and ignition tube 28 is a short length of steel pipe of smaller diameter than combustion chamber 12. Tube 28 is welded to opening 30 in the side of combustion chamber 12 near first end closure 14, and extends tangentially from combustion chamber 12.

Fuel inlet connection 32 is fitted to a tapped opening 34 in the top of combustion chamber 12. Opening 34 is located in approximately the same transverse plane of combustion chamber 12 as air supply and ignition tube 28. Fuel inlet connection 32 comprises plug 36 which is screwed into tapped opening 34, female connector 38 which is screwed onto plug 36, sleeve 40 which is inserted into male end 42 of female connector 38, and fuel supply line 44 which is inserted into short nut 46 before short nut 46 is tighetened onto male end 42 of female connector 38. A small orifice 48 is drilled concentrically through plug 36 before assembly of fuel inlet connection 32. The size of orifice 48 may vary, depending on the size and designed output of orchard heater 10. In the preferred embodiment, the diameter of orifice 48 is 1/16 inch (1.59 mm). In the preferred embodiment, the flow of liquefied petroleum gas through orifice 48 will be approximately 0.5 gallons per hour (1.89 liters per hour) when fuel is supplied at a pressure of 3 psig (0.21 kg/sq. cm.).

Water inlet connection 50 is fitted to tapped opening 52 in the bottom of combustion chamber 12. Opening 52 is located near second end closure 16. Water inlet connection 50 comprises plug 54 which is screwed into tapped opening 52, female connector 56 which is screwed onto plug 54, sleeve 58 which is inserted into male end 60 of female connector 56, and water supply line 62 which is inserted into short nut 64 before short nut 64 is tightened onto male end 60 of female connector 56. A small orifice 66 is drilled concentrically through plug 54 before assembly of water inlet connection 50. The size of orifice 66 may vary, depending on the size and designed output of orchard heater 10. In the preferred embodiment, the diameter of orifice 66 is 1/16 inch (1.59 mm). In the preferred embodiment, the flow of water through orifice 66 will be approximately 1 gallon per hour (3.79 liters per hour) when water is supplied at a pressure of 30 psig (2.1 kg/sq. cm.).

To operate orchard heater 10, the fuel supply is turned on and fuel is supplied to orchard heater 10 through fuel inlet connection 32. The fuel is ignited by means of a hand-held torch (not shown) the flame from which is directed into combustion chamber 12 through air supply and ignition tube 28.

Combustion occurs on the pulse-jet principle, wherein extremely rapid combustion of a small quantity of fuel and air occurs, which is, in fact, a small explosion. Most of the products of combustion take the path of least resistance, which is to say that most of the products of combustion travel the length of combustion chamber 12, and exhaust through exhaust tube 20. This rapid movement of the products of combustion creates a vacuum within combustion chamber 12 between fuel inlet orifice 48 and air supply and ignition tube 28. The vacuum causes air to be drawn in through air supply and ignition tube 28 to combine with fuel for the next combustion to take place. A small portion of the products of combustion escape through air supply and ignition tube 28 around the inner surface 70 of the tube 28. Air is drawn in through the center area of tube 28. Combustion cycles follow each other with comparatively great rapidity, so that the counterflow of intake air and combustion products in air supply and ignition tube 28 is, although pulsating, for all intents and purposes, a continuous flow.

Once combustion is established, water is supplied to combustion chamber 12 through water inlet connection 50. The water is vaporized by the hot products of combustion and the mixture is discharged through exhaust tube 20 to the surrounding atmosphere. The temperature of the mixture of combustion products and water vapor is approximately 900° F. (482° C.) at the point where the mixture exits exhaust tube 20.

The products of combustion of propane have a relatively high water content, and that fact, combined with injection of water into the hot combustion chamber, provides exceptionally moist hot air from the orchard heater. This is a desirable feature in protecting buds and blossoms from frost damage.

While this invention is susceptible of embodiment in different forms, the drawings and the specification illustrate the preferred embodiment of the invention, with the understanding that the present disclosure is to be considered an exemplification of the principles of the invention, and the disclosure is not intended to limit the invention to the particular embodiment described.

We claim:

1. A steam-producing pulse-jet-combustion orchard heater comprising:
   a cylindrical metal combustion chamber having a first end in which combustion occurs, and having a second end;
   an exhaust tube connected to the combustion chamber for conveying the products of combustion to the surrounding atmosphere;
   a means to supply liquefied petroleum gas to the combustion chamber;
   a means to supply air to the combustion chamber;
   a means to inject water directly into the combustion chamber near the second end thereof; and
   a means to support the heater above the ground.

2. The orchard heater of claim 1 wherein the combustion chamber first end is closed and wherein the second end has a concentric circular opening therein and wherein the combustion chamber has an opening in the side of the cylinder near the first end.

3. The orchard heater of claim 2 wherein the exhaust tube extends coaxially from the opening in the second end of the combustion chamber.

4. The orchard heater of claim 3 wherein the means to supply air to the combustion chamber is a pipe having a diameter less than that of the combustion chamber, said pipe extending tangentially outward from the opening in the side of the combustion chamber.

5. The orchard heater of claim 4 wherein the means to supply liquefied petroleum gas to the combustion chamber is a fitting through the cylindrical side of the combustion chamber, in approximately the same transverse plane as the air supply pipe, said fitting having an orifice therethrough, and having a conduit attached to convey liquefied petroleum gas under pressure into the combustion chamber.

6. The orchard heater of claim 5 wherein the means to inject water directly into the combustion chamber is a fitting through the cylindrical side of the combustion chamber, said fitting having an orifice therethrough, and having a conduit attached to convey water under pressure into the combustion chamber.

7. The orchard heater of claim 6 wherein the means for supporting the heater above the ground comprises a plurality of metal bars, each affixed at a first end to the underside of the heater, and with the second end of each of the bars extending radially from the heater.

8. A steam-producing pulse-jet-combustion orchard heater comprising:

a metal cylindrical combustion chamber having a closed first end and a second end with a concentric circular opening;

an exhaust tube extending coaxially from the concentric circular opening in the second end of the combustion chamber;

an air supply and ignition pipe, of smaller diameter than the combustion chamber, communicating with the interior of the combustion chamber, and extending tangentially outwardly from the combustion chamber near the first end thereof;

a fuel supply fitting let into the cylindrical side of the combustion chamber in approximately the same plane as the air supply and ignition tube, said fitting having an orifice therethrough, and having a conduit for connection to a supply of fuel under pressure;

a water supply fitting let into the cylindrical side of the combustion chamber near the second end thereof, said fitting having an orifice therethrough, and having a conduit for connection to a supply of water under pressure;

a first and a second metal leg, each attached at a first end to the combustion chamber in a spaced-apart transverse relationship and with their second ends extending approximately radially from the combustion chamber; and a third metal leg attached at a first end to the exhaust tube longitudinal line midway between the attachment points of the first and second legs, and with its second end extending approximately radially from the exhaust tube.

* * * * *